United States Patent
Thambidorai et al.

(10) Patent No.: US 8,131,712 B1
(45) Date of Patent: Mar. 6, 2012

(54) REGIONAL INDEXES

(75) Inventors: Gautham Thambidorai, San Jose, CA (US); Eisar A. Lipkovitz, San Francisco, CA (US); Cosmos Nicolaou, Palo Alto, CA (US); Li Fan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 11/872,386

(22) Filed: Oct. 15, 2007

(51) Int. Cl.
*G06F 7/00* (2006.01)

(52) U.S. Cl. .......................... 707/715; 707/610; 707/724

(58) Field of Classification Search .................. 707/610, 707/715, 724
See application file for complete search history.

(56) References Cited

U.S. PATENT DOCUMENTS

| | | | | |
|---|---|---|---|---|
| 5,893,093 | A * | 4/1999 | Wills | 707/5 |
| 6,526,440 | B1 * | 2/2003 | Bharat | 709/219 |
| 6,999,932 | B1 * | 2/2006 | Zhou | 704/277 |
| 2002/0156917 | A1 * | 10/2002 | Nye | 709/238 |
| 2004/0194099 | A1 * | 9/2004 | Lamping et al. | 718/100 |
| 2004/0254932 | A1 * | 12/2004 | Gupta et al. | 707/7 |
| 2006/0200490 | A1 * | 9/2006 | Abbiss | 707/102 |
| 2007/0038634 | A1 * | 2/2007 | Glover et al. | 707/10 |
| 2007/0288422 | A1 * | 12/2007 | Cao | 707/1 |
| 2008/0281804 | A1 * | 11/2008 | Zhao et al. | 707/5 |

* cited by examiner

*Primary Examiner* — Cheyne Ly
(74) *Attorney, Agent, or Firm* — Fish & Richardson P.C.

(57) ABSTRACT

A corpus of documents is identified, such as a large corpus of web documents. A quality score is applied to each, and at least some of the documents in the corpus of documents are identified based on their respective quality scores. At least one query characteristic, for instance, the language of a query, associated with a plurality of search queries is identified. A subset of documents in the corpus of documents is identified that satisfy the at least one query characteristic. An index is built that includes the identified at least some documents and the identified subset of documents.

15 Claims, 7 Drawing Sheets

REGIONAL INDEXES

FIELD

This document relates to regional indexes for a search system.

BACKGROUND

Computer databases now serve as storehouses for diverse types of information and media including documents, images, audio files, videos, and practically any other type of information capable of being transferred to a digital format. The interconnected nature of today's computing environment offers the capability for users to have nearly instant access to this information regardless of their physical location.

Search interfaces serve as gateways to the vast information stored in these databases. Due to the tremendous amount and diverse types of digital data that is now accessible, identifying relevant documents quickly and efficiently from a keyword search is a difficult task. This is particularly so because search systems have to index hundreds of millions of web pages and respond to millions of queries each day.

Indexes are the mechanisms used by search systems to allow relevant documents to be found as quickly as possible, and are generated based on continuous crawls of the world wide web. Building and maintaining an index for the entire web requires the collection and organization of raw documents having several tens of terabytes of data. As a result, responding to queries quickly and efficiently while identifying pertinent search results using an index remains a challenge.

SUMMARY

This specification describes the use of indexes at geographically distributed datacenters, where each index includes regional content that is based on the properties of query traffic received by its corresponding datacenter.

In general, one aspect of the subject matter described in this specification can be embodied in methods that include the actions of identifying a corpus of documents, applying a quality score to each document in the corpus of documents, and identifying at least some documents in the corpus of documents based on their respective quality scores. The method further includes identifying at least one query characteristic associated with a plurality of search queries, identifying a subset of documents in the corpus of documents that satisfy the at least one query characteristic, and building an index, the index including the identified at least some documents and the identified subset of documents. Other embodiments of this aspect include corresponding systems, apparatus, and computer program products.

These and other embodiments can optionally include one or more of the following features. Identifying at least one query characteristic associated with a plurality of search queries includes identifying a language associated with a plurality of search queries. Applying a quality score to each document includes applying a global quality score to each document. The method can also include receiving each of the plurality of search queries at a regional datacenter. Additionally, the method can include receiving each of the plurality of search queries from client devices in the geographic vicinity of the regional datacenter. The method can include determining a regional quality score to the identified subset of documents. A training model can also be built based on the identified at least one query characteristic, and identifying a subset of documents in the corpus of documents that satisfy the at least one query characteristic can include applying the training model to a subset of documents in the corpus of documents.

In general, another aspect of the subject matter described in this specification can be embodied in methods that include the actions of receiving a plurality of search queries, each of the plurality of search queries received from one or more user devices located in the geographic vicinity of a datacenter, identifying at least one query characteristic associated with the plurality of search queries, using the at least one query characteristic to identify one or more documents, in a corpus of documents, that satisfy the at least one query characteristic, and building an index associated with the datacenter, the index including the one or more documents that satisfy the at least one query characteristic.

These and other embodiments can optionally include one or more of the following features. Identifying at least one query characteristic associated with a plurality of search queries includes identifying a language associated with a plurality of search queries. The method can also include applying a quality score to each document in the corpus of documents, and/or applying a quality score to each of the one or more documents that satisfy the at least one query characteristic. The method can include building a training model based on the identified at least one query characteristic. Identifying one or more documents that satisfy the at least one query characteristic can include applying the training model to at least some of the documents in the corpus of documents. Further, building an index can include building an index associated with the datacenter, the index including the one or more documents that satisfy the at least one query characteristic, and one or more other documents in the corpus of documents, the one or more other documents selected based on a quality score.

Another aspect of the subject matter described in this specification can be embodied in systems that include a first regional index repository associated with a first datacenter, a second regional index repository associated with a second datacenter, and at least one server in communication with one of the first regional index repository and the second regional index repository, where the at least one server is operable to process queries using at least one of the first regional index repository and the second regional index repository. The first regional index repository includes at least some content identified from a corpus of world-wide documents, and first regional content identified at least in part using one or more identified query characteristics of queries received at the first datacenter. The second regional index repository includes the same at least some content identified from the corpus of world-wide documents, and second regional content identified at least in part using one or more identified query characteristics of queries received at the second datacenter.

These and other embodiments can optionally include one or more of the following features. The system can include at least one client device local to one of the first regional index repository and the second regional index repository. Additionally, the one or more identified query characteristics include at least one language of received queries. Further, the first datacenter and second datacenter can be geographically distant from each other. The first regional content and/or the second regional content can also be selected from the corpus of world-wide documents.

Particular embodiments of the subject matter described in this specification can be implemented so as to realize one or more of the following advantages.

DETAILED DESCRIPTION

Figure 1:
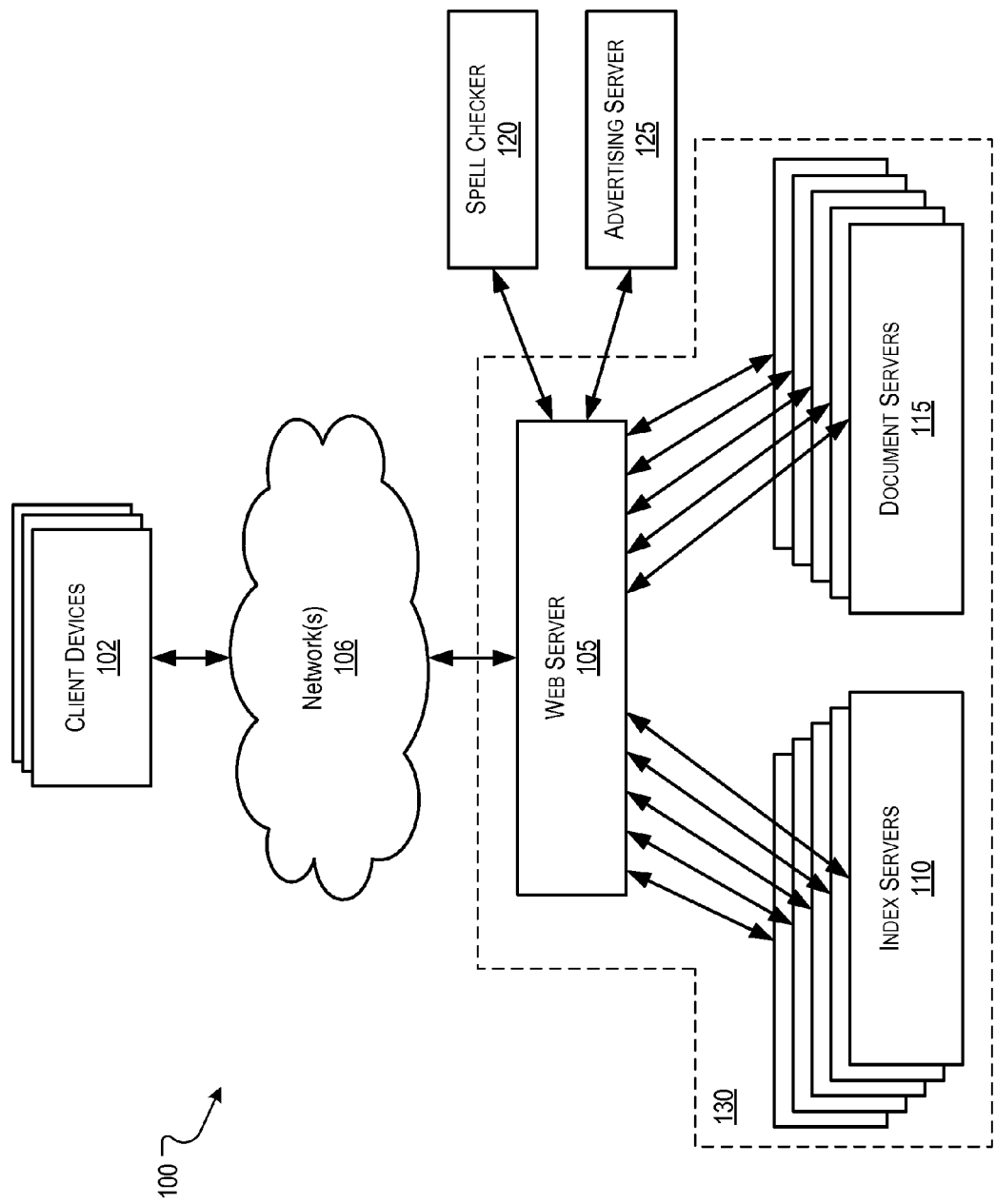
FIG. 1 shows an example information retrieval system.

FIG. 1 shows an example information retrieval system 100. The system 100 includes client devices 102 connected to a web server 105 that communicate with each other over at least one network 106. The client devices 102 can include computers, such as home computers, which can each include a browser for accepting user input and for displaying information that has been received from other systems over the network 106. The network 106 may include a local area network (LAN), a wide area network (WAN), a virtual private network (VPN), a telephone network, such as the Public Switched Telephone Network (PSTN), an intranet, the Internet, or a combination of networks.

The web server 105 can include a search engine (not illustrated) for receiving user search queries transmitted from the client devices 102 over the network 106. Responsive to receiving a search query, the web server 105 is operable to communicate the query to one or more index servers 110, which identify documents that match terms in the search query. One or more document servers 115 then fetch documents from storage to provide snippets used in providing at least one search result page to users using the client devices 102. As illustrated in FIG. 1, the system 100 can also include a spell checker 120, which can check the spelling of a search query, and an advertising server 125, which can generate relevant advertisements (if any) to place on a search results page.

As will be described in greater detail below with reference to FIG. 3, in some implementations the web server 105, index servers 110, and document servers 115 may be located in the same datacenter 130. For example, the web server 105 can represent a web server within a cluster of web servers located at a datacenter that is not geographically distant from the client devices 102. Thus, search queries received, for instance, from client devices 102 in the United States can communicate with a web server 105 in the United States instead of a geographically remote web server in another country or region, such as in Europe.

For the sake of illustration, FIG. 1 shows a single web server 105, spell checker 120, and advertising server 125; however, it will be appreciated that in practice there may be more or fewer servers, spell checkers, and/or advertising servers. Additionally, although the index servers 110, document servers 115, spell checker 120, and advertising server 125 are illustrated as communicating directly with the web server 105, some or all of the devices may communicate with the web server 105 via the network(s) 106. Thus, some or all of the components shown in FIG. 1 can be geographically remote from each other and can communicate via the one or more networks 106.

Figure 2:
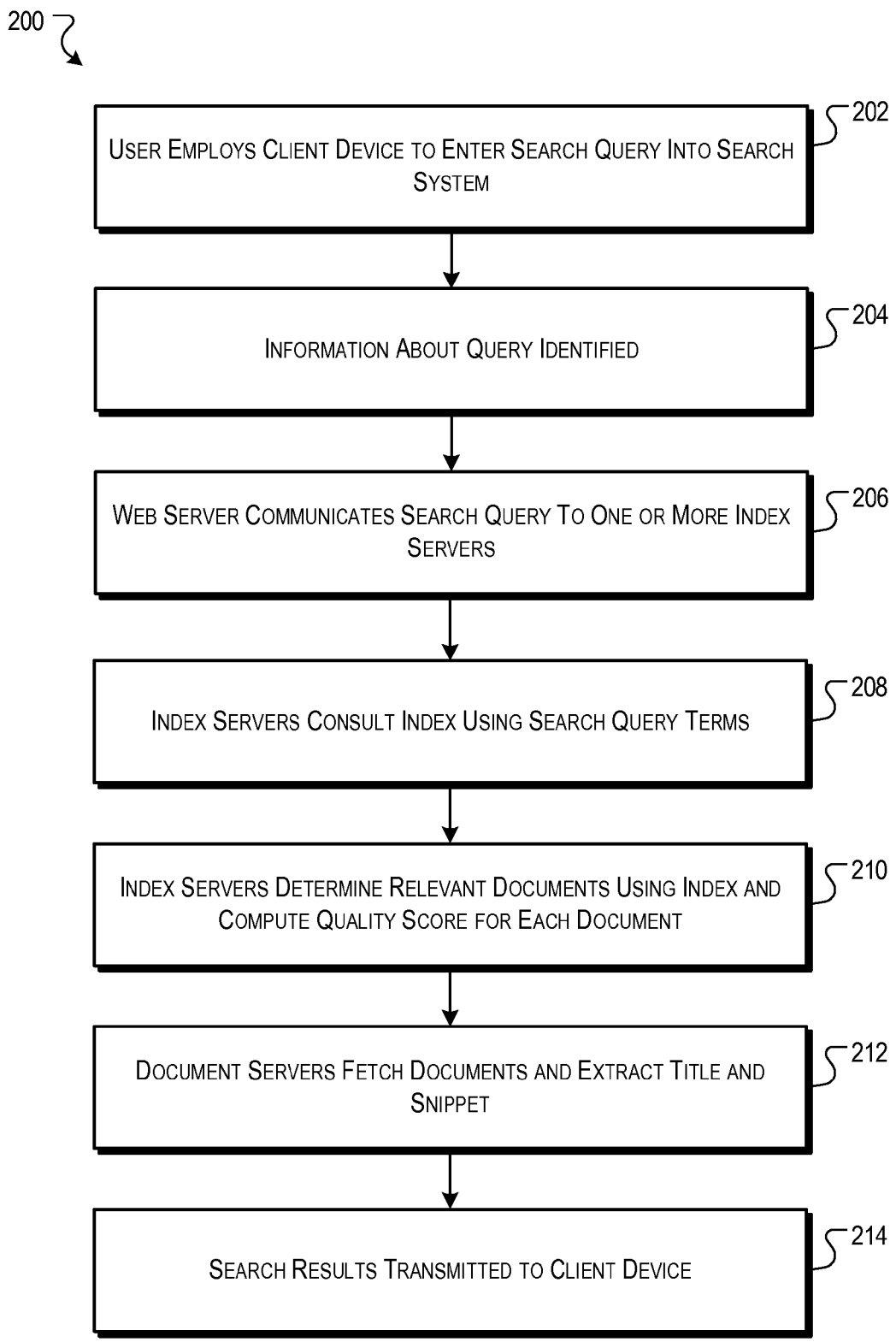
FIG. 2 shows a block diagram flow chart of an example information retrieval process.

FIG. 2 shows a block diagram flow chart of an example information retrieval process (200). The information retrieval process can occur, for example, in the information retrieval system 100 shown in FIG. 1. A user may use a client device 102 to perform a world wide web search by entering a search query in a browser for transmission to a search system (202). For example, a user may enter a hostname of a search system, e.g., "www.google.com", in a browser running on a client device. The browser can perform a domain name system (DNS) lookup to map the search system's hostname to a particular IP address. In some implementations, a DNS-based load-balancing system can select a cluster of web servers for the search system by accounting for the user's geographic proximity to each physical cluster of web servers. Once a cluster of web servers is identified, the browser of the client device 102 can transmit a hypertext transport protocol (HTTP) request to the cluster of web servers. After receiving a query, a web server within the cluster of web servers, for instance, the web server 105, coordinates the query execution and formats the results into a hypertext markup language (HTML) response to the user's browser.

Referring again to FIG. 2, upon receiving a search query, information about the query and/or the client device is identified (204). For instance, the location of the client device 102 that transmitted the search query can be obtained from the IP address of the client device 102. This can include, for instance, the country and/or region of the client device 102. As described below, the location from which queries originate and/or the content of queries can be used to build regional indexes of documents that are popular to users within or near a geographical region.

To execute a query the web server communicates the search query to at least one index server (206). The index servers are operable to consult an index that maps each query word to a matching list of documents, which is the hit list for the query (208). According to some implementations, the index is a data structure for supporting text queries, and utilizes the full text of web pages to associate search query terms with documents that include those search query terms. The index servers determine a set of relevant documents, for example, by intersecting the hit lists of the individual query words, and compute a quality score for each document (210).

Next, an ordered list of document identifiers is created from a quality score of each document. From the list of document identifiers, the actual title and uniform resource locator of the documents is determined, along with a query-specific document summary. The document servers fetch each document to extract the title and the keyword-in-context snippet (212). To execute this task each document server cluster has access to an online, low-latency copy of the entire Web. The snippets are transmitted to a client device for display to a user, where the quality score determines the order of results on the search results output page (214).

Figure 3:
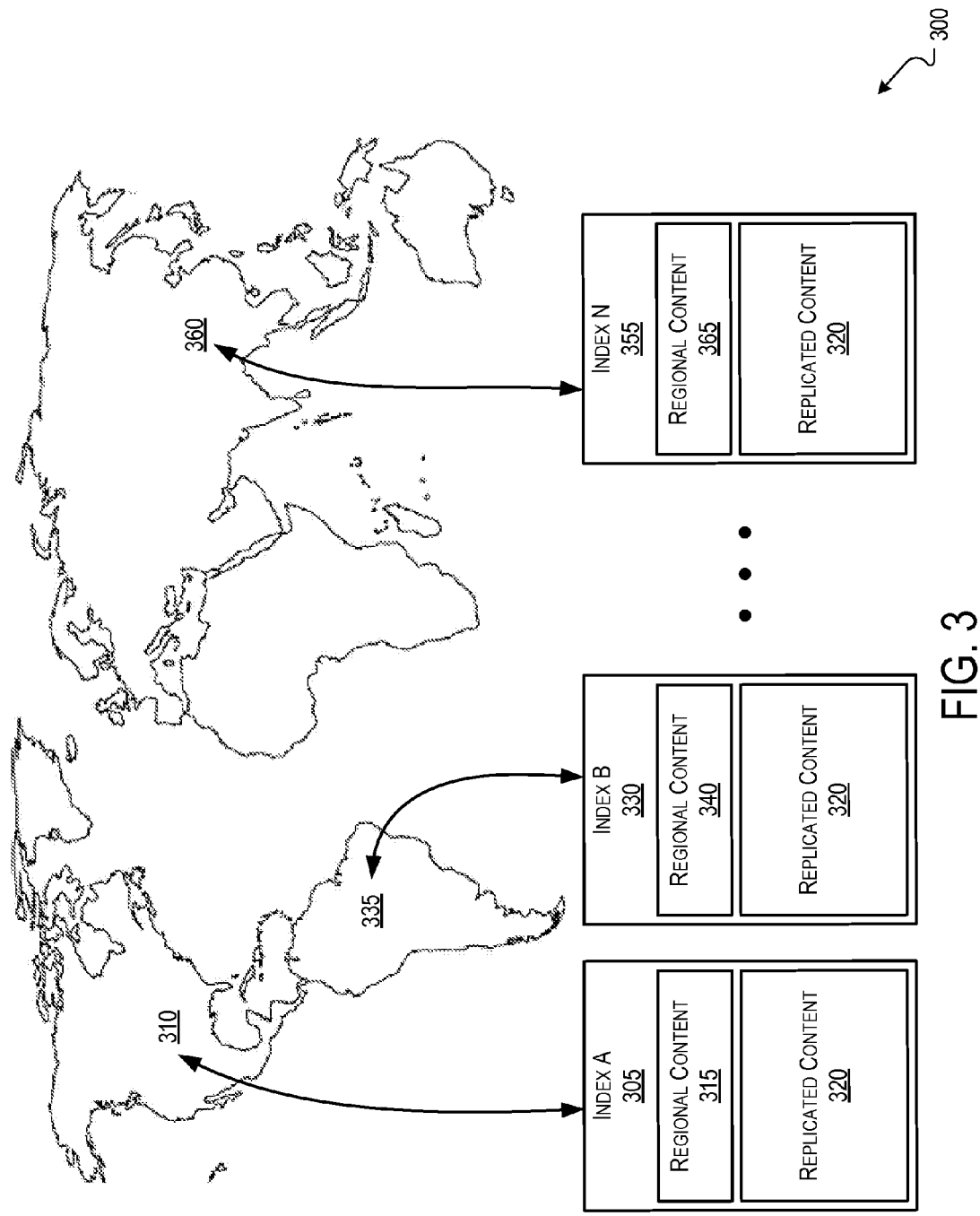
FIG. 3 shows example distributed indexes for use in an information retrieval system.

FIG. 3 shows example distributed indexes 300 for use in an information retrieval system, such as the information retrieval system 100 shown in FIG. 1. Each index may be stored within one or more associated index repositories, which can include one or more databases. Each index 305, 330, 355 can be associated with a particular geographic region 310, 335, 360. Additionally, each index can be associated with a particular datacenter. For instance, a search system accessible via the Internet, such as is accessible via the hostname www.google.com, can include several indexes, each located at a respective datacenter. A user-entered search query can be transmitted to a cluster of web servers at a particular datacenter by a DNS-based load-balancing system based at least in part on the user's geographic proximity to each physical cluster of web servers. It should be appreciated that the three indexes 305, 330, 355 shown in FIG. 3 are for illustrative purposes only; there may be several (or no) indexes in each country and/or region.

The use of distributed indexes at geographically distributed datacenters permits each index to contain regional content 315, 340, 365 that is based on the properties of query traffic received by its corresponding datacenter (704). As an example, a majority of search queries originating from client devices in Portugal are likely to be in Portuguese. Therefore, it is appropriate that responses to those queries will include more Portuguese documents than, for instance, English documents. As a result, an index that services Portugal should include more Portuguese documents than, for instance, an index that services the United States.

As shown in FIG. 3, the distributed indexes 305, 330, 355 also each contain replicated content 320 that is the same across all indexes 305, 330, 355. This content represents a selection of documents, from a corpus of world-wide documents, that have a high quality score regardless of the location of users that view them (702). In some implementations, the quality score is a global index selection score. The global index selection score ranks documents based in part on their popularity, and includes factors such as Pagerank, as described in "The Anatomy of a Large-Scale Hypertextual Web Search Engine," S. Brin and L. Page, WWW Conference, 1998. For instance, the home page for the web site with the hostname www.popular.com may be contained within the replicated content 320 existing at each of the distributed indexes because the web site is a popular destination for users around the world.

In some implementations, the volume of data reserved for replicated content would include approximately one-half (50%) to three-quarters (75%) of the volume of data stored at each distributed index. Other ratios may also apply so that more or less capacity is dedicated to replicated content. As an example, if each index 305, 330, 355 includes an index of 'X' billion documents, the replicated content can include 30% of the 'X' billion documents, and the regional content can include 10% of the 'X' billion documents.

Because the replicated content 320 includes world-wide content having the highest relevance score of all content identified by an information retrieval system, the replicated content 320 can be identified from a corpus of documents prior to the identification of regional content 315, 340, 365. For instance, if the entire corpus of documents known to an information retrieval system includes 'X' billion documents, the top 30% of those documents, as determined by the highest quality scores, may be selected for the replicated content 320 portion of each index 305, 330, 355. The remaining capacity of each regional index may then constitute documents that are not contained within the replicated content, which are similar in characteristics to the queries received at a datacenter, and which have some higher measure of popularity compared to other documents similar in characteristics to the queries received at the datacenter (708).

In some implementations, the regional content of each index 305, 330, 355 is based at least in part on a determination as to the raw query language characteristics of queries received at a datacenter containing the index. To identify characteristics of queries received at a datacenter, a log is maintained that is used to determine the percentage of queries in each language at each datacenter. The information for this log can be collected and maintained at a server that is remote from each data center, or a log may be maintained by each respective datacenter. For instance, a log maintaining data for all datacenters may identify the following search query profile:

85% of web queries from Portugal are in the Portuguese language

80% of web queries from Italy are in the Italian language

75% of web queries from Lithuania are in the Lithuanian language

As another example, a log corresponding to a particular datacenter may identify the following search query profile for that datacenter:

50% of web queries are in English

20% of web queries are in Portuguese

20% of web queries are in Arabic

5% of web queries are in Hindi

For each datacenter a trained model is built based on the data in the log. In addition to the language of query requests, the log can include the page impressions generated from queries received at the datacenter over the last 'X' months, such as 1, 3, 6 or 12 months.

In some implementations, a regional index selection score may be generated for each page presented by the regional datacenter responsive to user queries. This is similar to the generation of a global index selection score but represents an aggregated average score for only those documents served by the datacenter to users in the region associated with the datacenter. The regional index selection score can be used to rank documents based in part on their popularity, and can include factors such as Pagerank. In some implementations, the trained model is applied against the remaining documents in the corpus of documents, i.e., all documents not included in the replicated content. The highest ranked documents, based on the regional index selection score, that meet the model requirements (e.g., language requirements) are used to populate the regional content in an index.

In other implementations, the trained model is applied against the remaining documents in the corpus of documents, i.e., all documents not included in the replicated content. The highest ranked documents, based on the global index selection score, that meet the language requirements can be used to populate the regional content in an index. This process may only filter out documents in which the language differs from the predominant language used in queries at a regional datacenter and thus may return less popular documents, as determined by the region's users, than the use of a regional selection score as described above.

It will be appreciated that the trained model that is built based on the log may dictate that documents that are inconsistent with the language of the majority of queries received at a datacenter are not entirely excluded from the regional content. Therefore, it will be appreciated that the trained model may only weight documents based in part on their language characteristic, and that other characteristics, such as metrics of document quality, may control whether a document is identified in a regional index (706). For instance, although 85% of queries received in a Portuguese datacenter may be identified as in the Portuguese language, this may not prevent a trained model from identifying a non-Portuguese language document in the regional content if that document represents other characteristics, such as a high Pagerank. For instance, that document may be particularly popular in Portugal even though it is not in Portuguese and is not popular enough elsewhere (i.e., outside of Portugal) for placement in the replicated content 320. Thus, aggregate user behavior in a region can be an input to the trained model or the selection of local documents.

In some implementations, queries are received at a datacenter nearest the location of the client device from which a query originates. However, in other implementations, a search query may be examined upon receipt by an information retrieval system, such as the information retrieval system 100 of FIG. 1. The examination of search queries permits the transmission of queries to a specific datacenter that includes a regional index that is most likely to include documents responsive to the query. For instance, a query in Chinese transmitted to a U.S. datacenter may be re-routed and processed first by a Chinese datacenter. In other implementations, the query may be processed by both a U.S. and Chinese datacenter. Therefore, the location from which a query originates does not require that the query be handled by a datacenter closest to the user device from which the query was entered.

Figure 4:
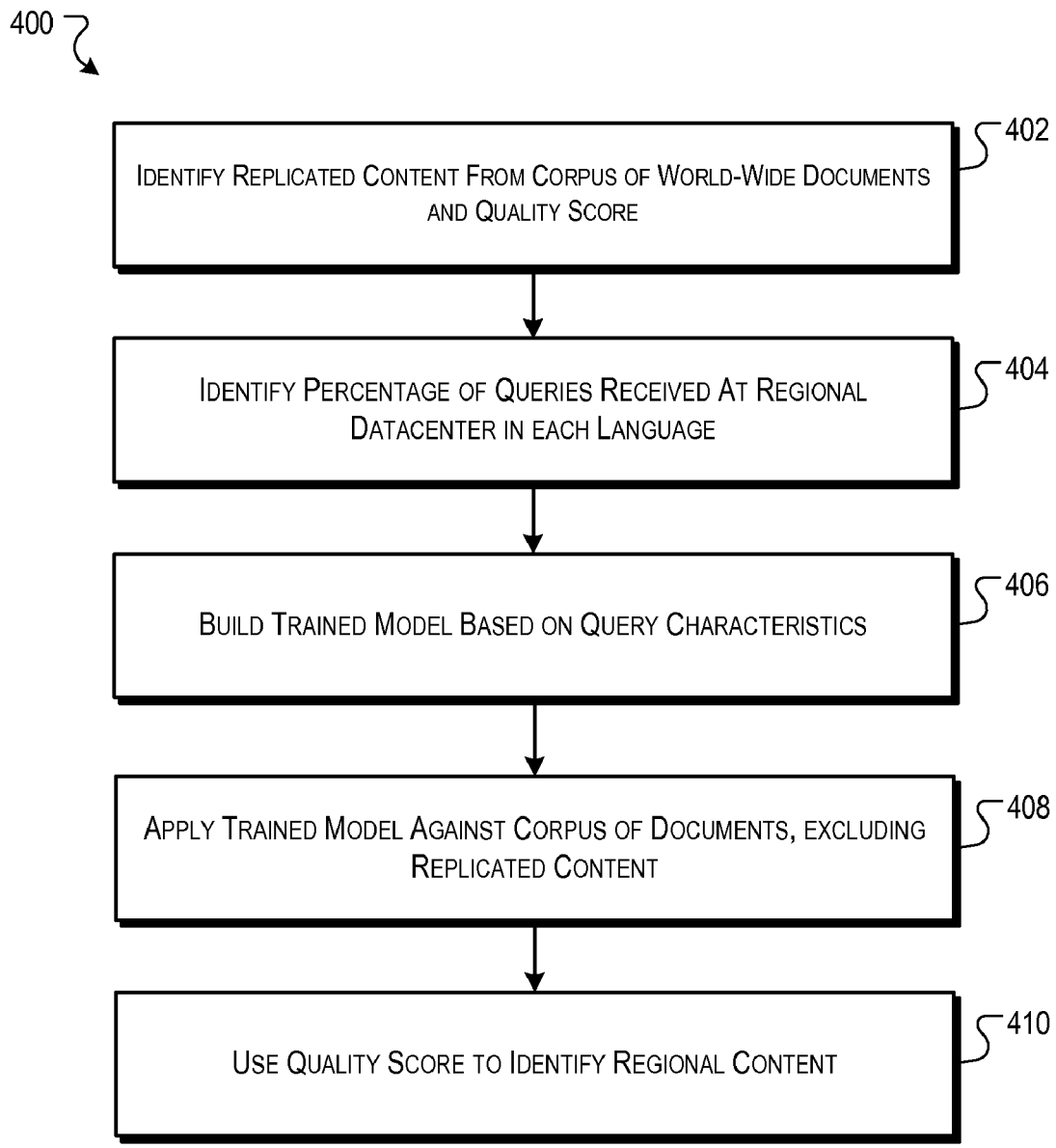
FIG. 4 is a block diagram of an example regional index population process.

FIG. 4 is a flowchart of an example regional index population process 400. First, replicated content is identified from a corpus of world-wide documents, where the replicated content is selected from the corpus of world-wide documents based on their quality scores (402). As described above, in some implementations, the quality score can include the global selection score. The documents having the highest quality scores are selected for the replicated content. It will be appreciated that the identification of replicated content can be determined at a web server that is non-local to the regional datacenters. For instance, there may be one world-wide location in which replicated content is generated and then transmitted to each of the regional datacenters.

Next, the percentage of queries received at a regional datacenter in each language is identified (404). As described with reference to FIG. 3, this data may be maintained in a query log in communication with one or more web servers at a regional datacenter. A trained model is built based on the query language characteristics (406). The trained model includes rule sets that filter documents to identify those consistent with the query language characteristics. In some implementations, the trained model also includes rule sets that filter documents to identify those that have been identified by the regional datacenter responsive to past query requests. The trained model may be executed by one or more web servers at the regional datacenter.

The trained model is subsequently applied against the corpus of world-wide documents, not including those documents identified in the replicated content (408). This permits the trained model to filter out documents that are inconsistent with the query characteristics received at the regional datacenter. Quality scores may then be used to prioritize and identify the regional content (410). In some implementations, the quality scores may be integrated into the trained model such that application of the trained model automatically identifies documents that are more relevant to queries received at the regional datacenter. Thus, the processes illustrated in blocks 408 and 410 in FIG. 4 may be combined. Additionally, the quality score used to rank regional content may be based on a regional index selection score or a global index selection score. The regional index selection score can be based on a log of documents provided by the regional datacenter responsive and selected by users that entered search queries.

Figure 5:
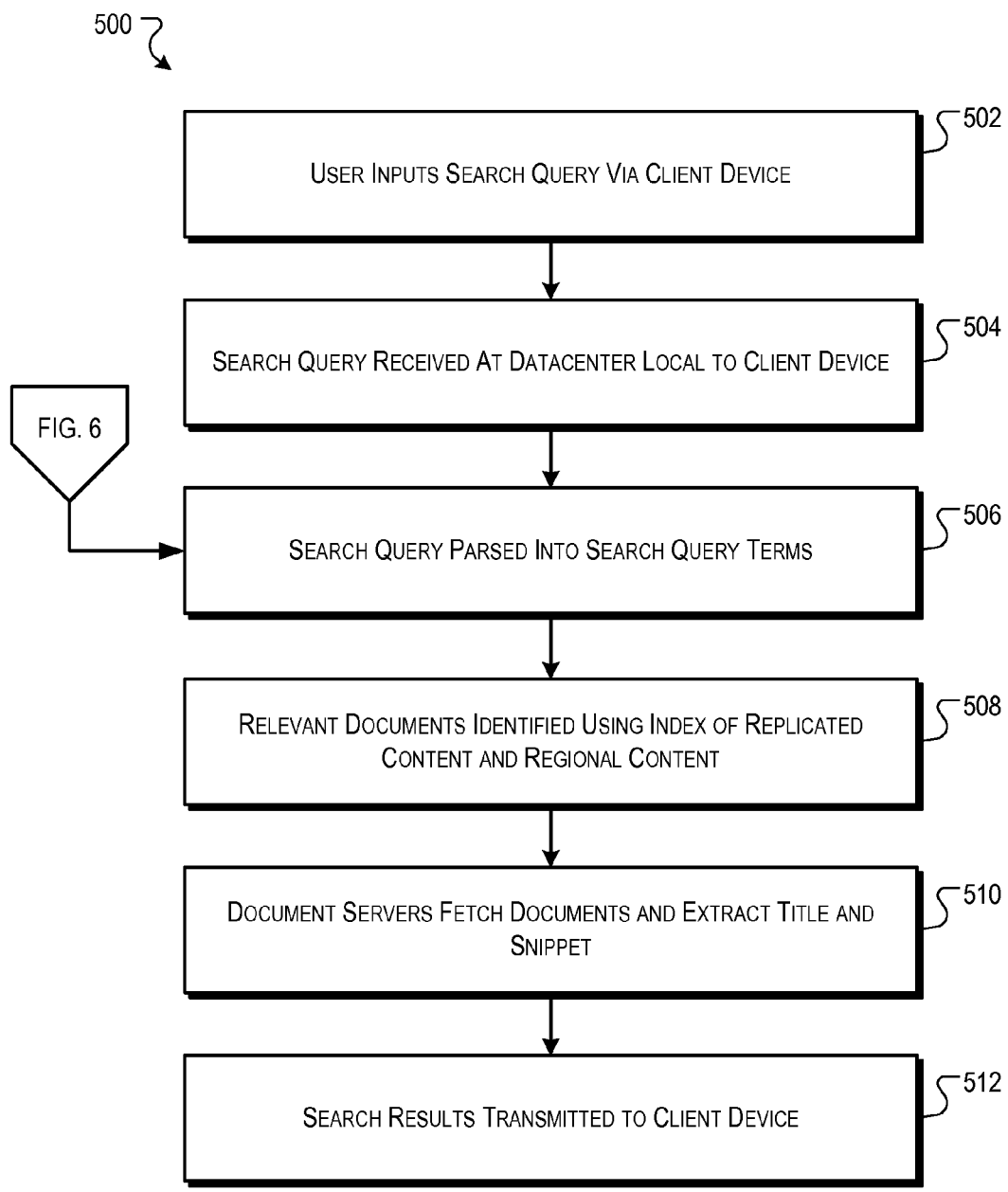
FIG. 5 shows a block diagram flow chart of an example information retrieval process using a regional index.

FIG. 5 shows a flow chart of an example information retrieval process 500 using a regional index. A user using a client device (e.g., the client device 102 of FIG. 1) inputs a search query (502). The search query is received at a datacenter local to the client device (504). For example, the search query is received at a web server associated with a search system accessed by the user via a browser on the client device. Next, the search query is parsed into search query terms (506). This may be implemented by the web server and/or by an index server, such as the web server 105 and/or index servers 110 shown in FIG. 1.

Relevant documents are identified using the regional index associated with the datacenter (508), which includes replicated content and regional content. Thereafter, document servers, such as the document servers 115 shown in FIG. 1, fetch the most relevant documents and extract the title and snippet for the documents (510). Thereafter, search results are transmitted to the client device (512), for instance, via one or more networks 106.

Figure 6:
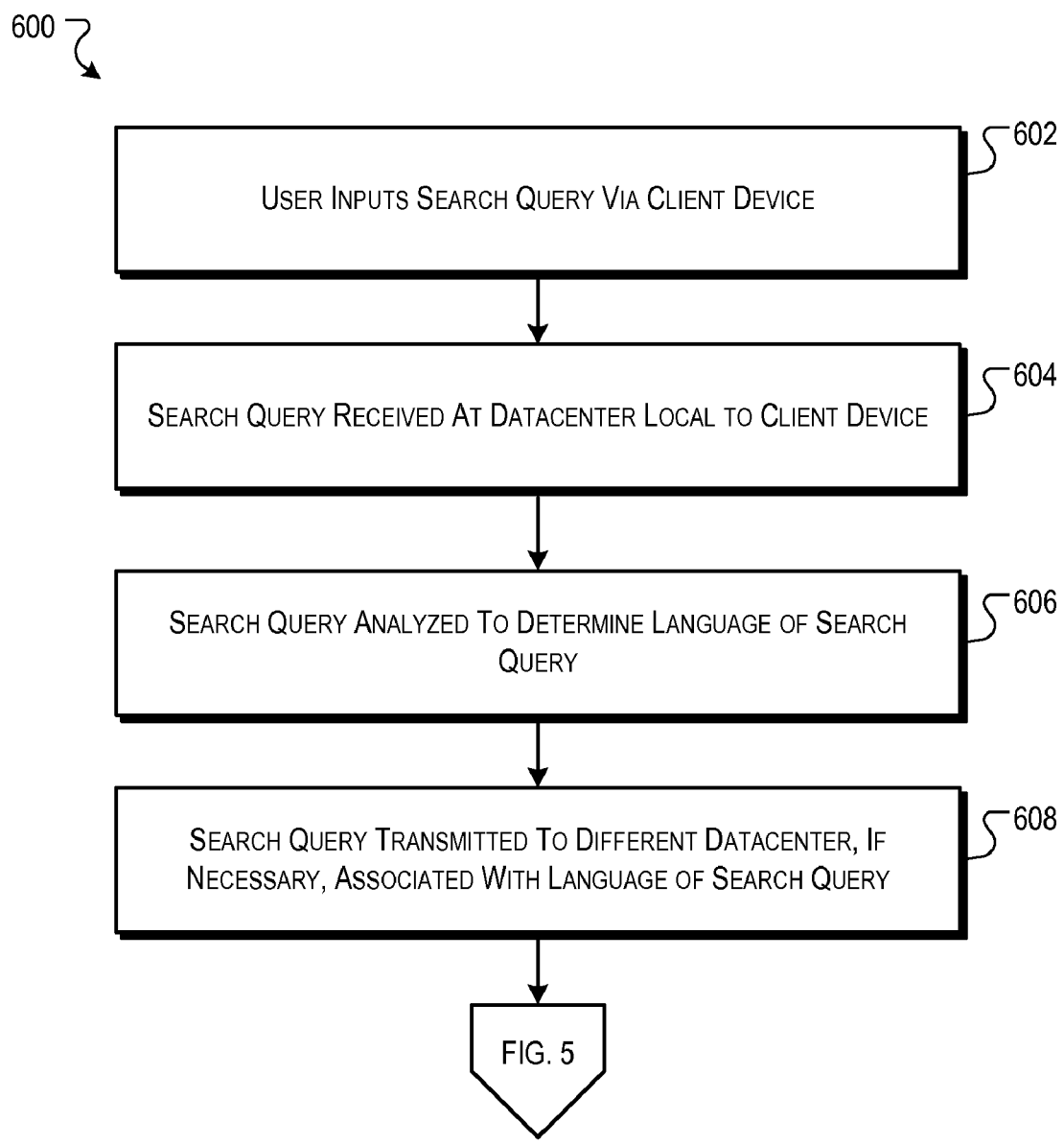
FIG. 6 shows a block diagram flow chart of another example information retrieval process using a regional index.
Figure 7:
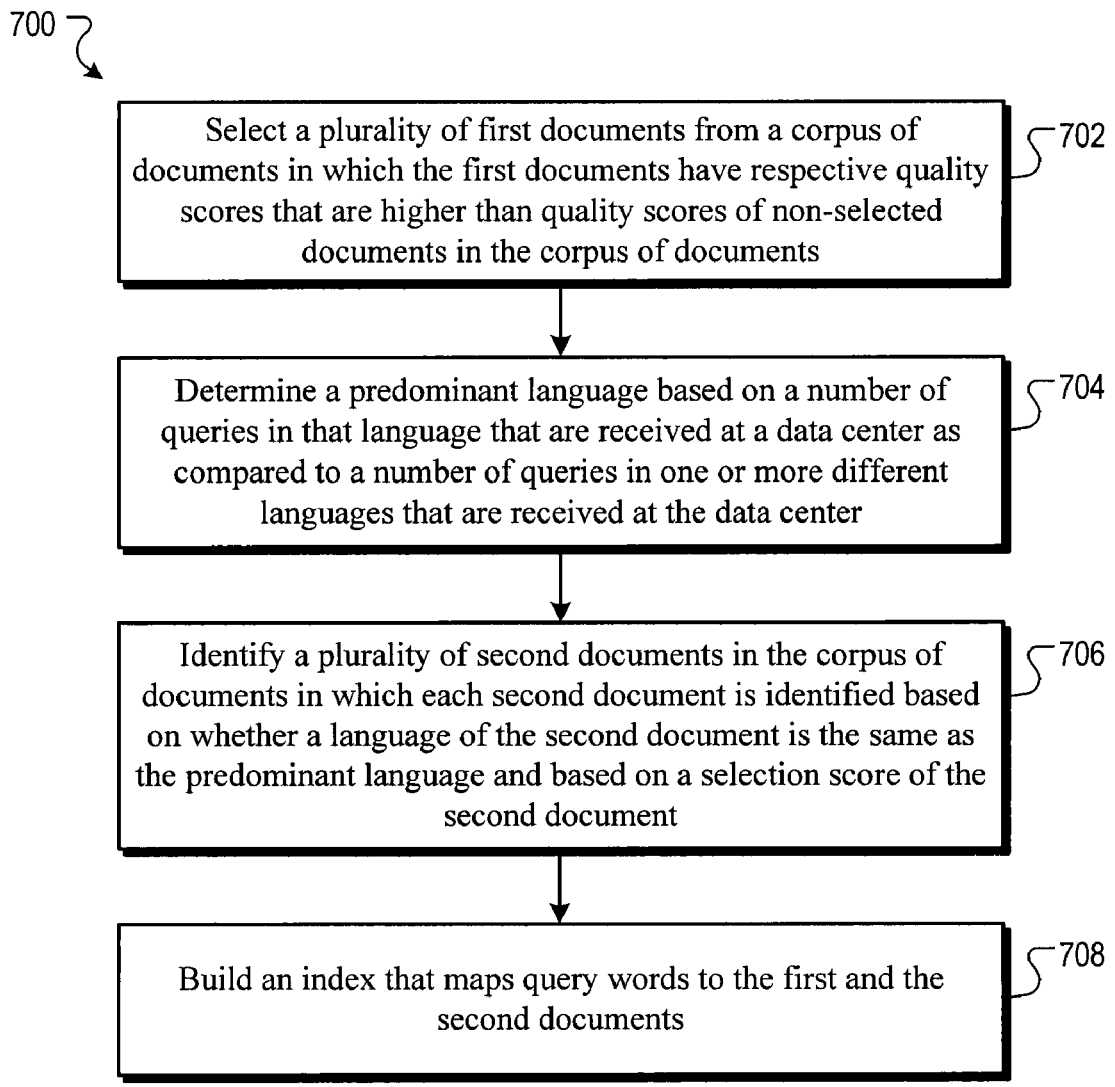
FIG. 7 shows a block diagram flow chart of an example of an index building process.

FIG. 6 shows a flow chart of another example information retrieval process using a regional index. A user using a client device (e.g., the client device 102 of FIG. 1) inputs a search query (602). The search query is received at a datacenter local to the client device (604). For example, the search query is received at a web server associated with a search system accessed by the user via a browser on the client device. Next, the search query is analyzed to determine the language of the search query (506). This may be implemented by the web server and/or by other devices, such as a language algorithm or language server, in communication with the web server. If the language of the search query is in a language that is more directly associated with a different datacenter, the search query is transmitted to that different datacenter (608), and the processing of the query continues as described with respect to the processes illustrated in blocks 506-512 of FIG. 5.

In some implementations, analyzing the search query (606) includes the comparison of the language of the search query to a table or log of regional datacenters that identify the datacenter or datacenters to which search queries in different languages should be forwarded. In some implementations, the search query may be executed at two or more regional data centers. If the language of the search query is in a language that is associated with the current datacenter, the search query is not transmitted to a different datacenter (608), and the processing of the query continues as described with reference to the processes illustrated in blocks 506-512 of FIG. 5.

The systems, apparatus, and methods described in this specification may be implemented in computer processing systems including program code including program instructions that are executable by the computer processing system, which may be made up of one or more computers at one or more locations. Other implementations may also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    building a replicated content index of first documents that each have a search result quality score determined at a plurality of data centers that is greater than a search result quality score for other search results at those data centers, wherein the data centers are located in different geographic regions and are each associated with a different predominant language, and wherein the replicated content index maps query terms to the first documents;
    building a regional content index of second documents that are popular as search results at a particular data center of the plurality of data centers, wherein the second documents are each written in the predominant language for the particular data center and do not include the first documents, and wherein the regional content index maps query terms to the second documents;
    replicating the replicated content index to a plurality of data centers of the data centers; and
    providing the regional content index to the particular data center.

2. The method of claim 1, further comprising:
    determining the predominant language for the particular data center based on a number of queries in the predominant language that are received at the particular data center as compared to a number of queries in one or more different languages that are received at the particular data center.

3. The method of claim 2 in which the queries are received from a plurality of client devices.

4. The method of claim 1 in which the replicated and regional content indexes are used by a server to process queries received from a plurality of client devices.

5. The method of claim 1 in which a total number of second documents indexed in the regional content index depends on a total number of first documents indexed in the replicated content index.

6. A system comprising:
one or more data processing apparatus configured to perform operations comprising:
building a replicated content index of first documents that each have a search result quality score determined at a plurality of data centers that is greater than a search result quality score for other search results at those data centers, wherein the data centers are located in different geographic regions and are each associated with a different predominant language, and wherein the replicated content index maps query terms to the first documents;
building a regional content index of second documents that are popular as search results at a particular data center of the plurality of data centers, wherein the second documents are each written in the predominant language for the particular data center and do not include the first documents, and wherein the regional content index maps query terms to the second documents;
replicating the replicated content index to a plurality of data centers of the data centers; and
providing the regional content index to the particular data center.

7. The system of claim 6, further comprising:
determining the predominant language for the particular data center based on a number of queries in the predominant language that are received at the particular data center as compared to a number of queries in one or more different languages that are received at the particular data center.

8. The system of claim 7 in which the queries are received from a plurality of client devices.

9. The system of claim 6 in which the replicated and regional indexes are used by a server in order to process queries received from a plurality of client devices.

10. The system of claim 6 in which a total number of second documents indexed in the regional content index depends on a total number of first documents indexed in the replicated content index.

11. A computer storage medium encoded with a computer program, the program comprising instructions that, when executed by data processing apparatus, cause the data processing apparatus to perform operations comprising:
building a replicated content index of first documents that each have a search result quality score determined at a plurality of data centers that is greater than a search result quality score for other search results at those data centers, wherein the data centers are located in different geographic regions and are each associated with a different predominant language, and wherein the replicated content index maps query terms to the first documents;
building a regional content index of second documents that are popular as search results at a particular data center of the plurality of data centers, wherein the second documents are each written in the predominant language for the particular data center and do not include the first documents, and wherein the regional content index maps query terms to the second documents;
replicating the replicated content index to a plurality of data centers of the data centers; and
providing the regional content index to the particular data center.

12. The storage medium of claim 11, further comprising:
determining the predominant language for the particular data center based on a number of queries in the predominant language that are received at the particular data center as compared to a number of queries in one or more different languages that are received at the particular data center.

13. The storage medium of claim 12 in which the queries are received from a plurality of client devices.

14. The storage medium of claim 11 in which the replicated and regional indexes are used by a server to process queries received from a plurality of client devices.

15. The storage medium of claim 11 in which a total number of second documents indexed in the regional content index depends on a total number of first documents indexed in the replicated content index.

* * * * *

UNITED STATES PATENT AND TRADEMARK OFFICE
CERTIFICATE OF CORRECTION

| | | |
|---|---|---|
| PATENT NO. | : 8,131,712 B1 | |
| APPLICATION NO. | : 11/872386 | |
| DATED | : March 6, 2012 | |
| INVENTOR(S) | : Gautham Thambidorai et al. | |

It is certified that error appears in the above-identified patent and that said Letters Patent is hereby corrected as shown below:

Column 12, Line 2 at Claim 9; replace:
        "regional indexes are used by a server in order to process" with
        -- regional indexes are used by a server to process --

Signed and Sealed this
Fifteenth Day of May, 2012

David J. Kappos
*Director of the United States Patent and Trademark Office*